June 1, 1926.
J. BLACKBURN
1,586,515
PRESELECTING AND SHIFTING DEVICE FOR TRANSMISSIONS
Filed June 30, 1924 4 Sheets-Sheet 1
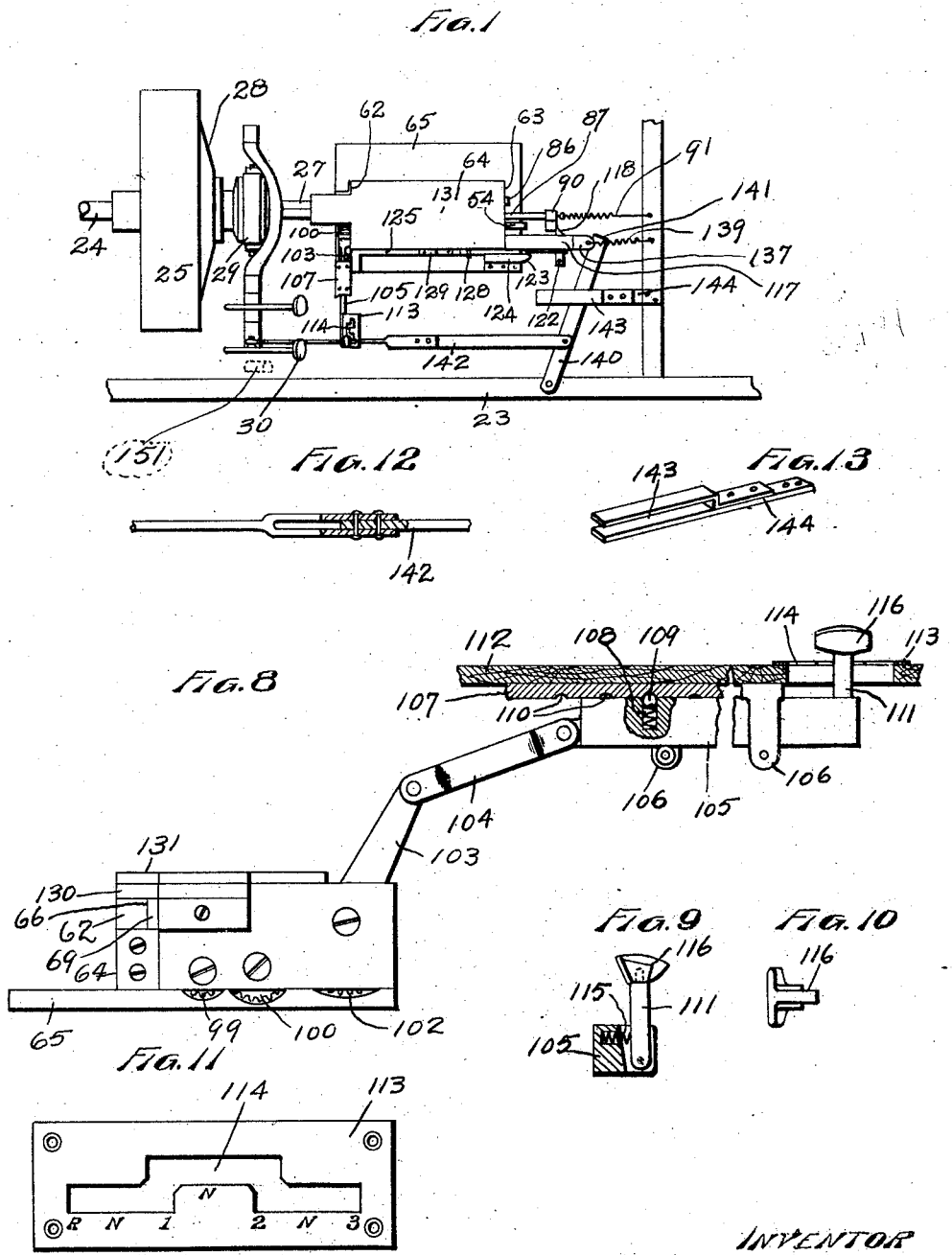
INVENTOR
JASPER BLACKBURN
ATTY.

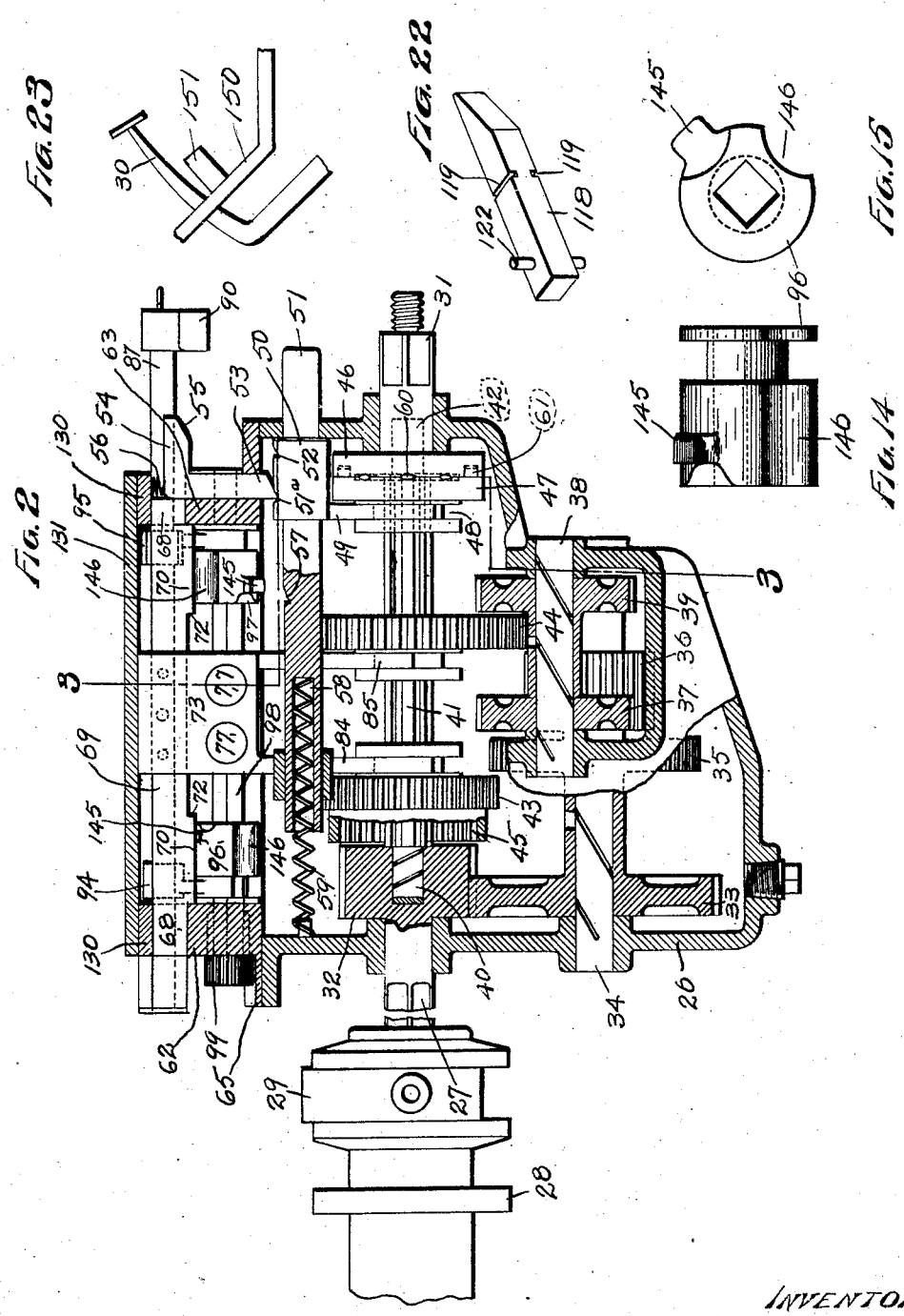

June 1, 1926.
J. BLACKBURN
1,586,515
PRESELECTING AND SHIFTING DEVICE FOR TRANSMISSIONS
Filed June 30, 1924  4 Sheets-Sheet 3
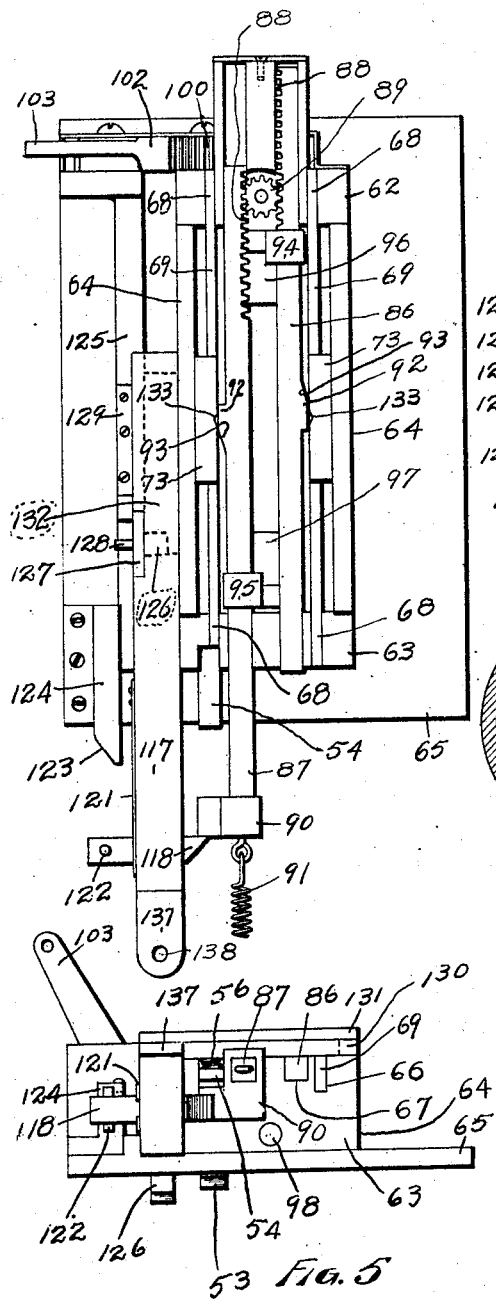
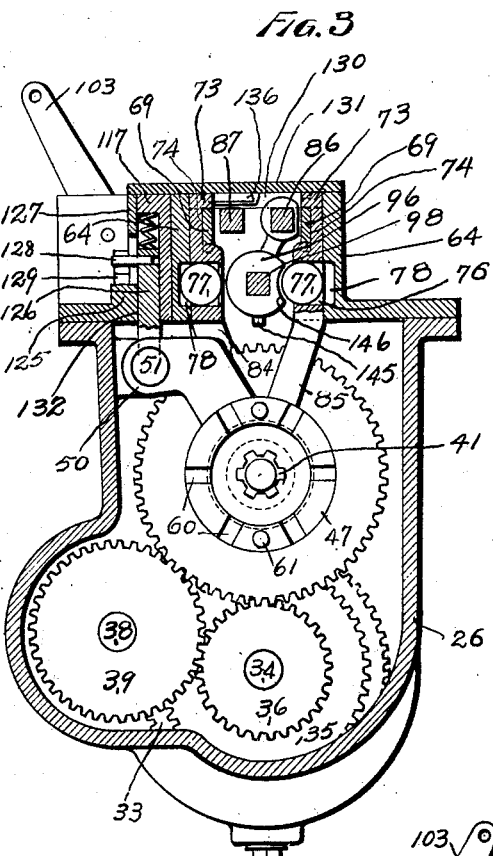
INVENTOR
JASPER BLACKBURN
ATTY.

June 1, 1926.  
J. BLACKBURN  
1,586,515  
PRESELECTING AND SHIFTING DEVICE FOR TRANSMISSIONS  
Filed June 30, 1924 4 Sheets-Sheet 4
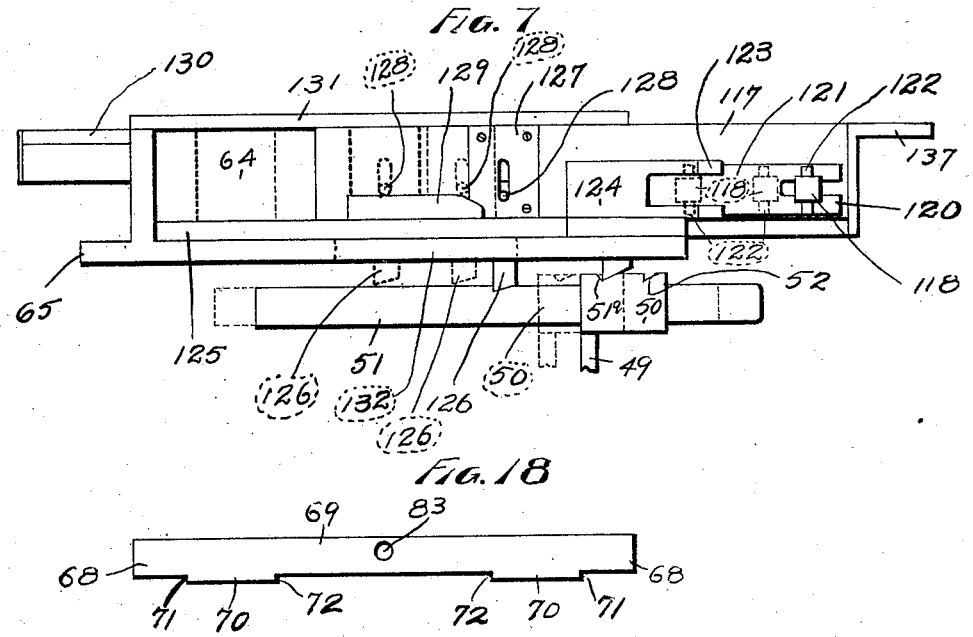
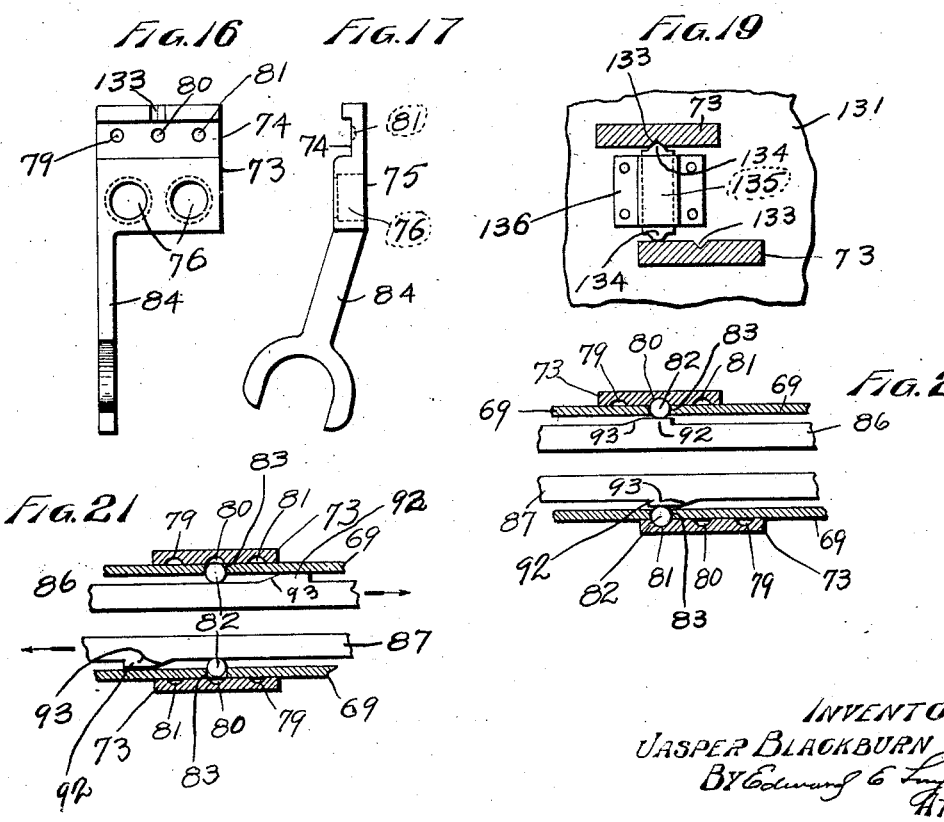
INVENTOR  
JASPER BLACKBURN  
BY Edward C Lyman  
ATTY.

Patented June 1, 1926.

1,586,515

UNITED STATES PATENT OFFICE.

JASPER BLACKBURN, OF WEBSTER GROVES, MISSOURI.

PRESELECTING AND SHIFTING DEVICE FOR TRANSMISSIONS.

Application filed June 30, 1924. Serial No. 723,187.

My invention relates to improvements in preselecting and shifting devices for transmissions and has for its primary object a device for motor vehicles in which various speeds can be preselected and the actual shifting of gears accomplished regardless of vehicle or motor speed.

A further object is to construct a preselecting and shifting device for transmissions in which it is possible to shift to one speed and immediately thereafter preselect a second speed without starting the vehicle at all.

A still further object is to construct a preselecting and shifting device for transmissions in which the shifting mechanism is automatically returned to its initial position and ready for another preselection as soon as the shifting of the first selection has been accomplished.

In the drawings:

Fig. 1 is a fragmental top plan view of a motor vehicle chassis showing my device attached thereto;

Fig. 2 is an enlarged longitudinal vertical section of the transmission housing with the preselecting and shifting device attached thereto;

Fig. 3 is a cross section taken on the line 3—3 of Fig. 2;

Fig. 4 is a top plan view of the preselecting and shifting mechanism with the cover removed;

Fig. 5 is a rear view of the preselecting and shifting mechanism removed from the transmission housing;

Fig. 6 is a front elevation of the same;

Fig. 7 is a side elevation of the same showing the manner in which the slide operates the rear clutch member;

Fig. 8 is a front elevation of the gear shifting and preselecting mechanism showing the same attached to the foot selector;

Fig. 9 is a fragmental sectional view of the slide bar showing the manner of attaching the foot selector thereto;

Fig. 10 is a top plan view of the pedal used on the foot selector;

Fig. 11 is an enlarged top plan view of the floor plate made use of;

Fig. 12 is an enlarged fragmental section of the connecting bar;

Fig. 13 is an enlarged perspective view of the lever support;

Fig. 14 is an enlarged side elevation of one of the preselecting drums;

Fig. 15 is an end view of the same;

Fig. 16 is a face view of one of the shifting elements;

Fig. 17 is an edge view of the same;

Fig. 18 is a face view of one of the slide bars;

Fig. 19 is a fragmental bottom plan view of the top showing the lock employed to prevent accidental movement of one of the shifting elements;

Fig. 20 is a fragmental sectional view showing the manner of locking the shifting elements in position;

Fig. 21 is a similar view showing the locking means released preparatory to moving one of the shifting elements; and Fig. 22 is a perspective view of the latch employed for operating the shifting mechanism;

Fig. 23 is a fragmental view showing the stop employed for shifting to neutral without operating the preselecting means.

In the construction of my device I employ a chassis frame 23 in which is mounted the usual engine, not shown. The engine is provided with a crank shaft 24, on one end of which is secured a fly wheel 25. Secured to the chassis frame in any well known manner, is a transmission housing 26 which has projecting from its forward end a driven shaft 27 on which is slidably mounted a clutch 28, this clutch having engagement with a clutch member formed either integral with the fly wheel 25 or mounted adjacent thereto on the engine shaft 24. The clutch member 28 is operated by the usual clutch collar 29 and foot lever 30. Projecting from the rear of the transmission housing 26 is a driving shaft 31, to this driving shaft is attached a universal joint, which in turn is connected to the propeller shaft leading to the rear axle. This universal joint and propeller shaft being old will not be shown or described in detail. Formed integral with the driven shaft 27 is a gear 32, this gear is located inside of the housing 26 and meshes with a gear 33 carried by the counter-shaft 34. Mounted on the counter-shaft 34 are gears 35 and 36 which are respectively second and first speed. Meshing with the gear 36 is a gear 37 which is mounted on a shaft 38. On the shaft 38 is also located the gear 39, the gears 37 and 39 constituting the reverse drive. The gear 32 is provided with a central opening in which the end 40 of a splined shaft 41 is mounted, the opposite end 42 of this shaft being mounted in the driving shaft 31. Slidably mounted on the shaft 41 are gears 43 and 44, the gear 43 is provided with a forwardly projecting portion 45 which is adapted to fit over the gear 32 and constitutes the high speed. The gear 43 is adapted to mesh with the gear 35 for second speed and the gear 44 to mesh with either the gear 36 or the gear 39 for first speed and reverse.

Carried by the shaft 31 and within the casing 26 is the member 46 of a clutch. The complementary member 47 of this clutch is slidably mounted on the shaft 41, the member 47 is provided with a grooved collar 48 into which a fork 49 passes. The fork 49 is carried by the member 50 which is secured to a shaft 51, the shaft 51 being slidably mounted in the housing 26. The member 50 is provided with recesses 51a and 52 into which one end of a pawl 53 is adapted to fit, the opposite end of the pawl 53 is provided with a right angular extension 54 which is beveled as at 55. The purpose of this pawl will be explained in detail later. The pawl is actuated by means of a spring 56. The shaft 51 is provided with a notch or recess 57, the purpose of which will be explained in detail later. The shaft is also provided with a bore 58 in which one end of a coil spring 59 is seated, the opposite end of this spring bearing against the front wall of the transmission housing 26. The purpose of this spring is to normally hold the clutch members 46 and 47 in engagement. The contacting faces of the clutch members 46 and 47 are provided with radially extending grooves 60 which permit oil to be squeezed out from between the members and permitting ready engagement of the clutch. The clutch as shown, has the member 47 provided with projecting pins 61 which are adapted to enter suitable recesses or pockets formed in the clutch member 46. Mounted on top of the housing 26 is a housing having a front wall 62, a rear wall 63, side walls 64 and around its lower edge a flange 65, the front and rear walls 62 and 63 are provided with slots 66 and 67. In the slots 66 are located the ends 68 of the slide bars 69. Adjacent the ends 68 the bars are made wider, as at 70 forming shoulders 71 and 72. The shoulders 71 are adapted to abut against the inside of the end walls 62 and 63 and prevent the bars from shifting, while the shoulders 72 are adapted to come in contact with the slide 73 of the shifting elements. The slide 73 of the shifting elements is provided with a groove 74 which is adapted to receive that part of the slide bar between the shoulders 72. The slide 73 has its rear face 75 in contact with the side walls 64. The slide 73 is also provided with cylindrical openings 76. The opening at the inside face of the slide being slightly reduced (See Figs. 16 and 17) so as to prevent the balls 77 which are located therein, becoming unseated. The walls 64 are provided intermediate their ends with recesses 78 which permit the balls to drop therein so as to be clear of the inside face of the slide (see Fig. 3), the purpose of this will be explained in detail later. The groove or recess 74 of the slide 73 is also provided with recesses or detents 79, 80 and 81 and into which a ball 82, located in the opening 83 in the slide bars 69, is adapted to pass. The purpose of this will be explained in detail later. The slide bars are provided with forks 84 and 85, the fork 84 operating the second and high speed gear, and the fork 85 the first and reverse.

Mounted in the slots 67 are bars 86 and 87, these bars are provided on one end with teeth 88, these teeth are located opposite each other and are designed to mesh with a gear 89 carried by the front wall 62 and are for the purpose of causing the bars 86 and 87 to travel in opposite directions simultaneously. The bar 87 projects rearwardly from the wall 63 and is provided on its end with a lug 90. This bar has also attached to its projecting end a coil spring 91, the purpose of which is to normally hold the bar 87 and consequently the bar 86 in the position indicated in Fig. 4. The bars 86 and 87 are also provided with projections 92, one face of which is inclined as at 93. These projections are adapted to contact with the balls 82 and force them into one of the recesses 79, 80 or 81 and prevent accidental shifting or sliding of the shifting elements, and also at the same time release the balls from the recesses in the shifting elements when the bars 86 and 87 are moved. Carried by the bars 86 and 87 are forks 94 and 95 respectively, these forks are in turn connected respectively to shifting drums 96 and 97. These drums are slidably mounted on a shaft 98. The drums 96 and 97 while being slidably mounted on the shaft 98 are still so secured thereto that they cannot be rotated independently of the shaft and for this purpose a square shaft is preferably used. The forward end of the shaft 98 projects through the front wall 62 and has secured on its end a gear 99 which meshes with a gear 100, this gear is also carried by the front wall. Meshing with the gear 100 is a segment 102 which is provided with an arm 103. The arm 103 is pivotally connected to a link 104, the opposite end of this link being in turn pivotally connected to a slide bar 105. The slide bar 105 is supported in brackets 106 carried by a plate 107, this plate may be either attached to the floor board of a motor vehicle or it may be attached to any suitable place either on the vehicle or some portion of the transmission housing. This however, is optional with the builder and depends a great deal on the amount of space available between the floor board and the transmission housing. The slide bar 105 is also provided with a recess or bore 108 in which a spring actuated ball 109 is located. The ball 109 is adapted to enter recesses 110 formed in the face of the plate 107 adjacent the slide bar and is to prevent any accidental sliding of the bar 105 due to road shocks. Pivotally carried by the free end of the bar 105 is the foot selector which consists of a bar 111 which projects forward through the floor 112, and also through the floor plate 113. The floor plate 113 is provided with a groove 114, the central portion of which is offset, as illustrated in Fig. 11. The purpose of this offset is to provide a shoulder against which the bar 111 can strike during the preselecting so that the movement of the slide bar and the foot selector is limited between two speeds and it will be impossible for the operator to accidentally shift from a reverse to high speed or vice versa, or in fact to accidentally skip a speed.

My device is so arranged that points midway between reverse and first, first and second, and second and third causes the transmission to be preselected for neutral. In this way I have three points from which my device can be set into neutral and thus a great deal of foot manipulation is eliminated.

The bar 111 is forced toward the operator by means of a coil spring 115 and is provided on its upper end with a T shaped pedal 116. My purpose of making the pedal T shaped is that the two wings of the T permit the foot to readily press the bar 111 forward, while the leg of the T permits the foot to readily move the lever or slide bar to the right or left as the case may be.

Mounted against the wall 64 adjacent the bar 87 is a slide 117, this slide has extending horizontally therethrough a latch 118. The latch 118 is provided in its top and bottom face with a slit or groove 119 which is adapted to receive the bifurcated end 120 of a leaf spring 121. The latch has also extending vertically therethrough a pin 122, this pin is adapted to come in contact with the inclined faces 123 of the bifurcated latch puller 124 and release the latch from the lug 90. The slide is retained in position by means of a rib 125 which is formed integral with the flange 65 and spaced apart from the wall 64 against which the slide 117 rests. Located vertically in the slide is a spring actuated pawl 126, this pawl is retained in position within the slide by means of a slotted plate 127. The pawl 126 is provided with a pin 128 which extends through the slot in the plate and adapted to come in contact with the inclined lug 129 carried by the rib 125, the purpose of this lug and latch will be explained in detail later.

It will be noted that the ends 62 and 63 are lower than the sides 64 and in order to make up this deficiency after the parts have been assembled in the housing, filler plates 130 are employed. Over these filler plates and sides 64 is placed a cover 131, this cover is also of sufficient width to extend over the slide 117 and prevent its being lifted or being jolted out of position. It is to be understood of course, that the flange 65 is provided with a slot 132 through which the pawl or latch 126 passes, the purpose of this slot will be explained in detail later.

The slides on the shifting elements are provided on their inner faces and adjacent their top edges with recesses or notches 133, these notches are designed to receive the ends 134 of the lock 135 which is slidably located in a housing 136 secured to the underside of the cover 131. It will be noted from Fig. 19 that the lock 135 is longer than the distance between the inside faces of the slides 73, the purpose of this is that as soon as one slide is moved, the lock is forced into the recess of the opposite slide thus holding it in position and against accidental movement because there is no other way in which this slide can be thus held, as during the shifting the balls 82 are released from both of the slides. The ends 134 of the lock 135 however, cannot enter the recess of the slide unless that shifting element is in neutral position; in other words, when the gear controlled by that particular slide is midway between the two gears with which it is designed to mesh.

Secured to the rear end of the slide 117 is an L shaped bracket 137 which is provided with an eye 138 to which a spring 139 is secured, the opposite end of the spring 139, as well as the end of the spring 91 being secured to any suitable portion of the vehicle frame.

Carried by the chassis frame 23 is a pivoted lever 140, its free end 141 is adapted to come in contact with the bracket 137 and move the slide forward. The lever 140 is connected to the clutch pedal 30 by means of a link 142 and in order to prevent excessive vibration of the lever 140 the same is mounted in the bifurcation 143 of the lever support 144. This lever support may be attached either to the chassis frame as shown, or it may be carried by the transmission housing, this however, is optional with the builder. It will also be noted that the end 141 of the lever 140 when the main clutch is in engagement is positioned at some distance to the rear of the bracket 137. This is to allow the driving clutch 28 to be disengaged before the lever contacts with the slide 117 and commences the shifting operation.

The operation of my device is as follows—

I will start describing the operation presuming the machine to be in the garage and ready to back out, after the engine has been started the bar 111 is moved so that it occupies the position in the slot 114 in the floor plate marked R. This movement rotates the shaft 98 and brings the point 145 on the preselecting drum 96 in alinement with the slide adjacent the bar 86. This movement also brings the groove 146 of the preselecting drum 97 in alinement with the balls 77 carried by the same slide. A forward movement of the clutch pedal first disengages the clutch 28. As soon as the clutch 28 has been disengaged the end 141 of the lever 140 comes in contact with the bracket 137 and commences to move the slide 117 and during this time the latch 118 is in contact with the lug 90 and the pawl 126 is located in the notch 57, while the pawl 53 is at rest in the notch or recess 51$^a$. A continued depression of the clutch lever now carries back the bar 51, as well as pushing forward on the bar 87, this forward pushing on the bar 87 in turn causes the bar 86 to move backward. This movement causes the preselecting drums to move toward each other simultaneously. The movement of the shaft 51 continues until the latch 53 drops into the recess 52 at which time the clutch members 46 and 47 are completely disengaged. At the moment the pawl 53 enters the recess 52 the pin 128 rides up on the lug 129 and raises the pawl 126 out of the notch 57, the pawl 53 now holding the clutch members 46 and 47 in disengaged position. At this time the point or projection 145 comes in contact with the slide carrying the fork 85 and commences to push it backward. The movement of the bars 86 and 87 have also released the balls 82 which have heretofore been seated in the recess 80 of the slide. A continued depression of the clutch pedal now commences to shift the slide which carries the fork 85 and in so doing forces one of the ends 134 of the lock 135 into the recess 133 of the slide which carries the fork 84. A continued forward movement now commences to shift the gears. At this point one of the balls 77 carried by the moving slide rides out of the recess 78 formed in the side walls 64 and projects inwardly from the slide, as illustrated in Fig. 3, but is prevented from contacting with the preselecting drum on account of the slot 146 being in alinement with the ball. A continued movement causes the gears to commence to mesh, as soon as the gears have partially meshed, the lug 90 comes in contact with the inclined face 55 of the right angular extension 54 of the pawl 53 and raises the pawl 53 out of the notch or recess 52 thus releasing the latch 57 and permitting the spring 59 to force it backward and re-engage the clutch members 46 and 47.

At the time when the shifting of the gear 44 into the gear has been completed the pin 122 has ridden up the inclined surface 123 and withdrawn the latch 118 permitting the spring 91 to pull the bar 87 backward to its original starting position.

Before starting the car backward that is, letting in the clutch, the operator now moves the foot pedal over to number 1, this brings the projection 145 carried by the pre-selecting drum 97 in alinement with the slide which carries the fork 85. First or low speed forward has now been preselected, the next step is for the driver to gradually let in his clutch and in so doing the spring 139 pulls the slide 117 backward to its original or starting position. The latch by reason of its inclined face and the leaf spring 121 rides past the lug 90 and is again in position to again commence shifting. All of this however, takes place prior to the final movement of engaging the clutch 28 and further letting in of the clutch carries the end 141 and lever 140 clear of the bracket 137. A slight depression of the clutch pedal will now merely disengage the clutch without shifting the gears, this is essential because the operator may desire to bring the car to a stop or to proceed in a rearward direction. After the car has been backed out of the garage, it is only necessary to again depress the clutch pedal to its fullest extent and the transmission will be shifted to first or forward speed, and while the clutch pedal is still depressed, second speed can be preselected and ready for shifting upon depressing the clutch again.

In the same manner after having arrived at high speed I can set my device either for second speed, first speed or neutral according to traffic conditions encountered, and thus it will not be necessary for the driver to make sudden decisions and possibly forget to shift gears after coming to a halt in traffic, as this can all be done at times when the driver's mind is at rest and not be confused or excited by congested traffic conditions.

When my device has been shifted to a preselected speed by the movement of the slide 73 one of the balls 77 has been forced past the recess 78 so that it projects from the face of the slide, as illustrated in Fig. 3. Then as the preselector is shifted to any of the neutral positions the shifting sleeves 97 and 98 are so turned that neither the projection 145 nor the recess 146 is in alinement with the slide or ball. Then upon depressing the clutch pedal and operating the shifter bars 86 and 87, the inner face of one of the preselecting drums will contact with the ball 77 and force the slide toward the center. This movement continues until the ball 77 drops into the recess 78 which disengages it from the preselecting drum with which it is in contact and permits the drum to ride past.

In Fig. 23 I have illustrated another means of shifting the transmission into neutral without operating the preselecting lever. In this instance, I mount on the toe board 150 of the vehicle, a stop 151, this stop is adjacent the clutch pedal 130 and is of a sufficient height to permit the pedal to be depressed only half way, and in depressing the pedal half way the slide 73, designed to be operated according to the preselection, is moved only half way or to neutral position. In utilizing the stop 151 it is necessary to place the foot on the clutch pedal in such a manner that a portion of the shoe sole projects beyond the side of the pedal and comes in contact with the stop, thus effectually preventing complete depression of the clutch pedal and consequently causing only the first half of the shift to be completed, and that half being the movement of the shifted gear to a neutral position.

It will further be noted that the rearward movement of the slide 117 is limited by the slot 132 formed in the flange 65, the rear edge of this slot being so arranged that the latch or pawl 126 abuts against its end and limits further rear movement of the slide, the forward movement of the slide being controlled by the clutch pedal.

In the event that the transmission housing is set close under the floor boards, I may dispense with the gear 100 and quadrant 102 and use a rack meshing with the gear 99. The rack, in this instance, would be connected to the slide bar 105 by means of the link 104.

Having fully described my invention, what I claim is:

1. In a preselecting and shifting device for transmissions, comprising a casing, gears, some of which are slidably located in said casing, a clutch located at each end of said casing, a preselecting mechanism located within the casing, means operable by the preselecting mechanism for shifting the sliding gears, means for disengaging said clutches, means for permitting one of said clutches to be reengaged while the other clutch is being further disengaged, means for operating the preselecting mechanism for preselecting a predetermined speed, means operated by the clutch disengaging means and connected to the preselecting means for shifting said transmission to the preselected speed, and means whereby said preselecting and shifting mechanism is automatically returned to its starting position when the shift has been made.

2. A preselecting and shifting device for transmissions comprising a transmission housing, a sliding gear transmission located therein, a clutch located without said housing and at the driven end thereof, a second clutch located at the driving end of said transmission, a shaft located in said housing, preselecting drums slidably secured on said shaft and rotatable therewith, means for rotating said shaft, means for moving said preselecting drums toward each other simultaneously, means co-acting with said drums for shifting a preselected gear, means whereby the clutches at the driven and driving end are released in sequence and the clutch at the driving end reengaged when the shift is partially completed, and means whereby the preselecting drums are returned to their starting position at the completion of the gear shift.

3. A preselecting and shifting device for transmissions comprising a housing, a plurality of gears rotatably mounted in said housing, a plurality of gears slidably mounted in said housing, a driven shaft for placing some of said gears in rotation, a driving shaft adapted to be driven by the sliding gears, a clutch mounted on the driven shaft, a second clutch mounted on the driving shaft, a preselecting means for preselecting one of the sliding gears, means for operating the clutch on the driven shaft, means connected to said clutch operating means for disengaging the second mentioned clutch after the first mentioned clutch has been disengaged and for operating the preselecting means thereby shifting the preselected gear after said disconnection has been made, means for automatically re-engaging of the second mentioned clutch when the shifting has been partially completed, and means for returning the preselecting means to starting position when the shifting has been completed and before the clutch on the driven shaft has been reengaged.

4. A preselecting and shifting device for transmissions comprising in combination with a casing containing a plurality of gears, some of which are slidably mounted, and a foot-operated preselecting mechanism, said transmission having a clutch located at its driven end and a second clutch at its driving end, means for disengaging said clutches in sequence, means operated by the clutch disengaging means for operating the preselecting mechanism for shifting to a preselected gear, means for holding the clutch at the driving end out of engagement during the initial portion of the shift, means adapted to be released during the movement of the preselecting mechanism operating means for automatically reengaging said clutch when the shift is partially completed, and means for returning the preselecting and shifting mechanism to its starting position when the shift has been completed and before the clutch on the driven end has been reengaged.

5. A preselecting and shifting device for transmissions comprising a sliding gear transmission and its casing, a clutch located at the driven end thereof, a second clutch located at its driving end, shifting elements carried by said casing for bringing certain of said gears in operative position, preselecting drums capable simultaneously of movement to and from each other for operating said shifting elements means for operating said drums and clutch, foot operated means for bringing the desired drum into operative position, means for re-engaging the second clutch when the shift is partially completed and means for returning said preselecting drums and their operating mechanism to their initial position while the first mentioned clutch is disengaged whereby said preselecting drums may be set for a new speed without first re-engaging the first mentioned clutch.

6. A preselecting and shifting device for transmissions comprising a sliding gear transmission, shifting elements for operating said sliding gears, a preselecting and shifting mechanism for operating the shifting elements, means for operating said preselecting and shifting mechanism, means for returning the preselecting mechanism to its starting position whereby, a second selection may be made immediately after the first selection has been completed and without placing the transmission in operation, and means whereby the movement of the preselecting shifting mechanism operating means is limited and said preselecting and shifting mechanism is only partially operated whereby said transmission is returned to neutral position without changing the setting of the preselecting and shifting mechanism.

7. A preselecting and shifting device for transmissions comprising in combination with a casing containing a plurality of gears, some of which are slidably mounted, and a preselecting mechanism, said transmision having a clutch located at its driven end, and a second clutch at its driving end, means for disconnecting said clutches in sequence, means carried by the casing for holding the clutch at the driving end out of engagement during the initial portion of the shift, means for automatically releasing said holding means whereby said clutch is re-engaged when the shift is partially completed, means for automatically returning the shifting preselecting mechanism to its starting position when the shift has been completed and before the clutch on the driven end has been re-engaged, and means located adjacent the clutch disconnecting means whereby the movement of said clutch disconnecting means is limited and the shifting mechanism only operated partially, whereby said transmission may be returned to neutral position without changing the preselecting means.

8. A preselecting and shifting device comprising a sliding gear transmission and its housing, shifting elements slidably mounted in said housing for operating said sliding gear of said transmission, means for holding said shifting elements against movement before and after shifting, means for holding one of said elements against movement during the movement of the other element, a pair of preselecting drums capable of rotary movement and of movement simultaneously to and from each other located in said housing adjacent the shifting elements, foot operated means for rotating said drums so that one thereof may be brought in contact with a preselected shifting element and move it in the desired direction, a clutch located at the driven end of said transmission, a second clutch located at its driving end, a clutch pedal for disconnecting said clutches in sequence, means for returning the second mentioned clutch and the preselecting drums to their original position while the first mentioned clutch is still disengaged whereby a second preselection can be made before re-engaging the first mentioned clutch, and means for limiting the movement of the clutch pedal whereby said transmission may be shifted to neutral after a preselection has been made without changing said preselection.

9. The preselecting and shifting device of claim 5 in which a stop is located adjacent the clutch and drum operating means for limiting the movement of said drum operating means, whereby the transmission may be shifted to neutral when shifting from one speed to another without changing the preselection.

In testimony whereof, I have signed my name to this specification.

JASPER BLACKBURN.